(12) United States Patent
Ogata et al.

(10) Patent No.: US 6,614,720 B1
(45) Date of Patent: Sep. 2, 2003

(54) OPTICAL PICKUP DEVICE

(75) Inventors: Nobuo Ogata, Nara (JP); Chiaki Kiyooka, Tenri (JP); Makoto Horiyama, Nara (JP); Kohji Minami, Gose (JP); Takahiro Miyake, Soraku-gun (JP); Yasuo Nakata, Takaichi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/559,515

(22) Filed: Apr. 27, 2000

(30) Foreign Application Priority Data

Apr. 28, 1999 (JP) .......................................... 11-121103

(51) Int. Cl.⁷ .................................................. G11B 7/00
(52) U.S. Cl. ............................. 367/112.28; 369/44.23; 369/112.06; 369/112.18
(58) Field of Search ........................... 369/44.14, 44.23, 369/44.37, 44.42, 110.01, 110.02, 112.03, 112.06, 112.07, 112.11, 112.12, 112.15, 112.16, 112.18

(56) References Cited

U.S. PATENT DOCUMENTS

| | | | | |
|---|---|---|---|---|
| 4,952,787 A | | 8/1990 | Nakamura et al. ....... 250/201.5 |
| 5,568,457 A | * | 10/1996 | Yang et al. ............... 369/44.23 |
| 5,644,413 A | | 7/1997 | Komma et al. ................ 359/19 |
| 5,708,644 A | * | 1/1998 | Hasegawa ................ 369/44.12 |
| 6,154,433 A | * | 11/2000 | Hoshino et al. ........ 369/112.04 |
| 6,154,434 A | * | 11/2000 | Shibano et al. ......... 369/112.15 |
| 6,192,020 B1 | * | 2/2001 | Takasuka et al. ........... 369/103 |
| 6,252,686 B1 | * | 6/2001 | Ando ....................... 369/44.14 |
| 6,266,313 B1 | * | 7/2001 | Yanagawa et al. ..... 369/110.01 |
| 6,327,237 B2 | * | 12/2001 | Yanagawa et al. ..... 369/112.19 |
| 6,496,453 B2 | * | 12/2002 | Asada et al. ............. 369/44.23 |

FOREIGN PATENT DOCUMENTS

JP        5-114157        5/1993

* cited by examiner

Primary Examiner—Thang V. Tran
Assistant Examiner—Bach Vuong
(74) Attorney, Agent, or Firm—Edwards & Angell, LLP; David G. Conlin; David A. Tucker

(57) ABSTRACT

Beam shaping means may have a shaping ratio set to allow a light beam emitted from a semiconductor laser and having an elliptic intensity distribution to have an ellipticity of no more than two to obtain a spot achieving high light availability and reduced in size. Furthermore, the shaping ratio can be set to no more than 2.5 to allow a polalized-beam splitter (light separation means) and other components to be arranged in a converged flux passing between the semiconductor laser and a collimator lens.

6 Claims, 16 Drawing Sheets

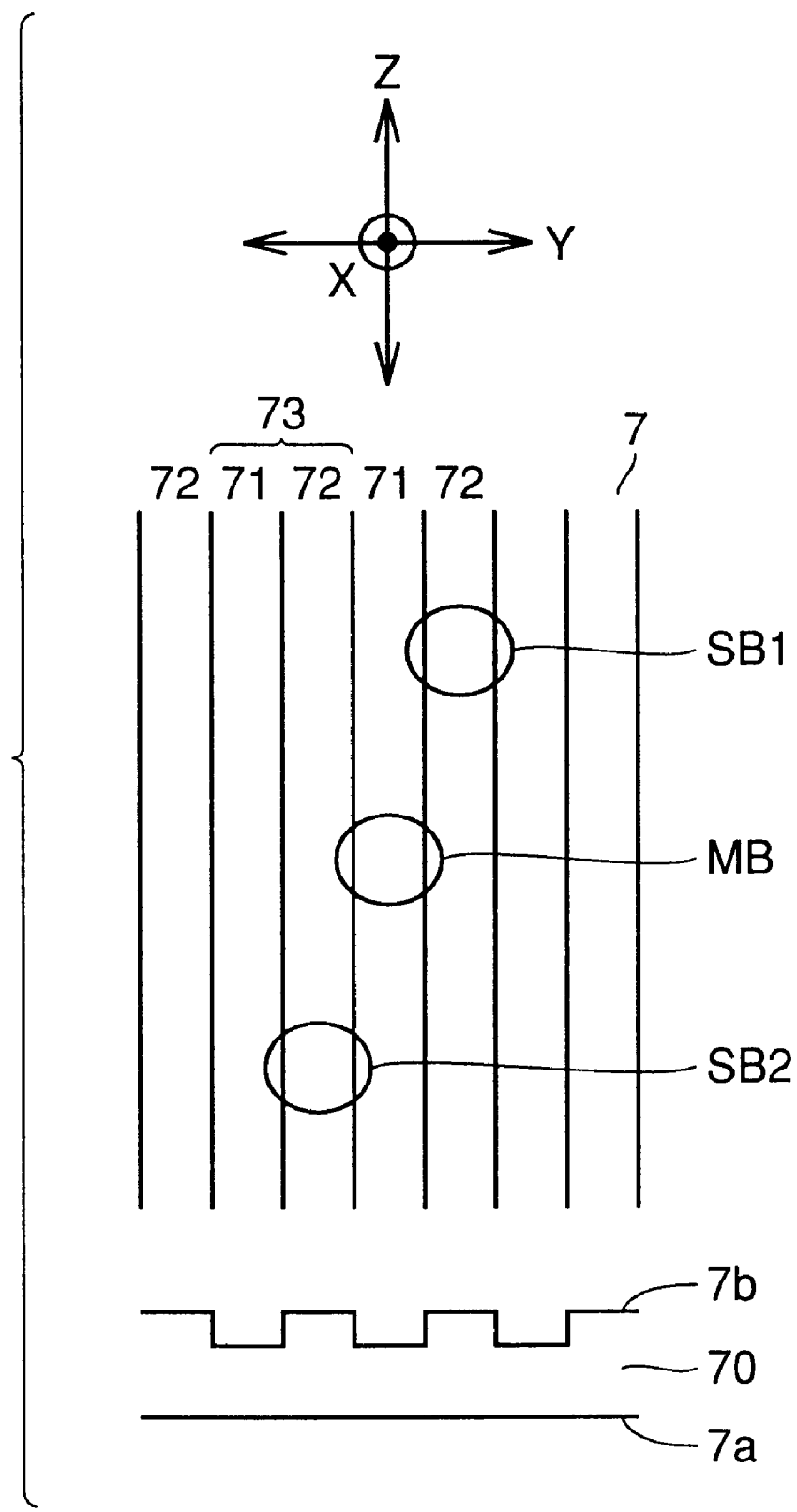

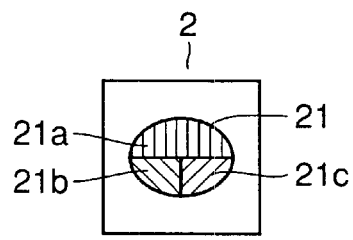
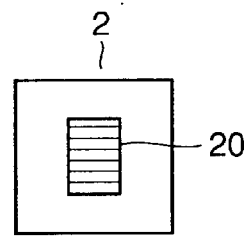
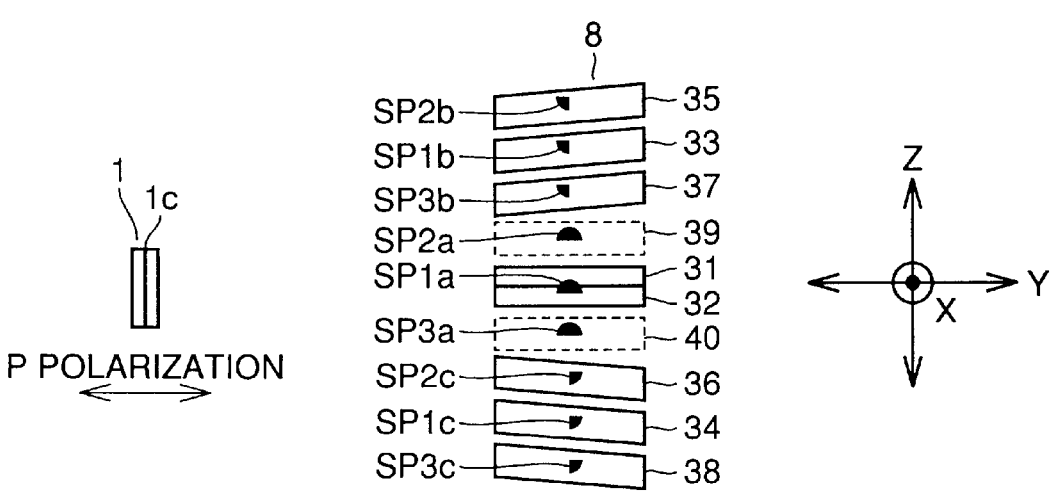

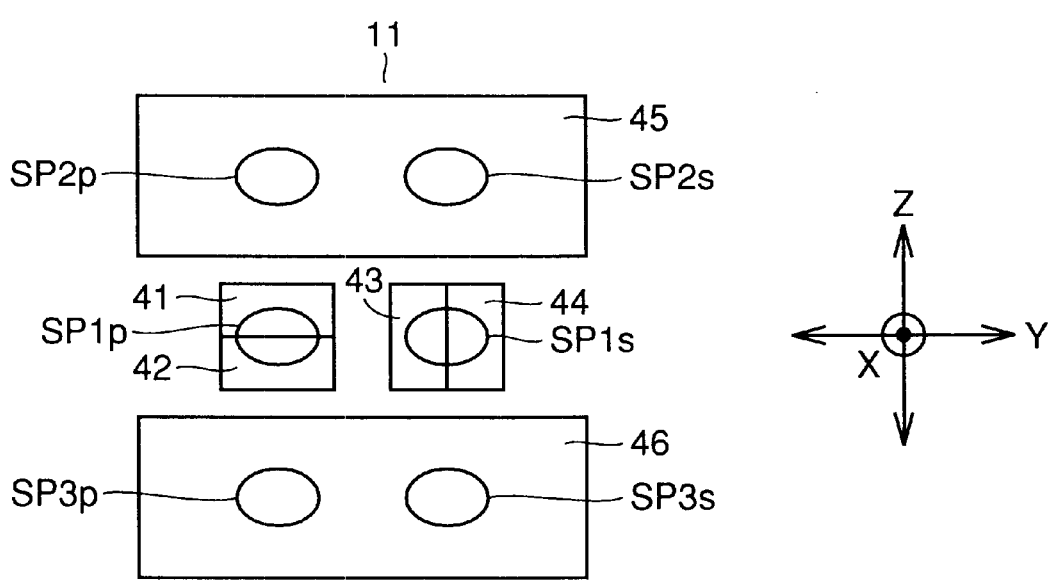
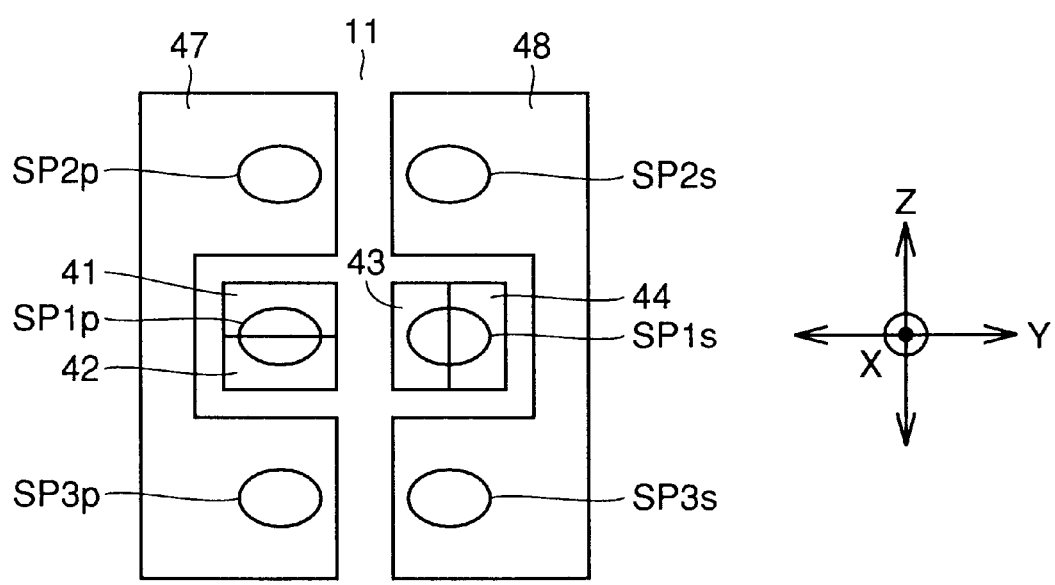

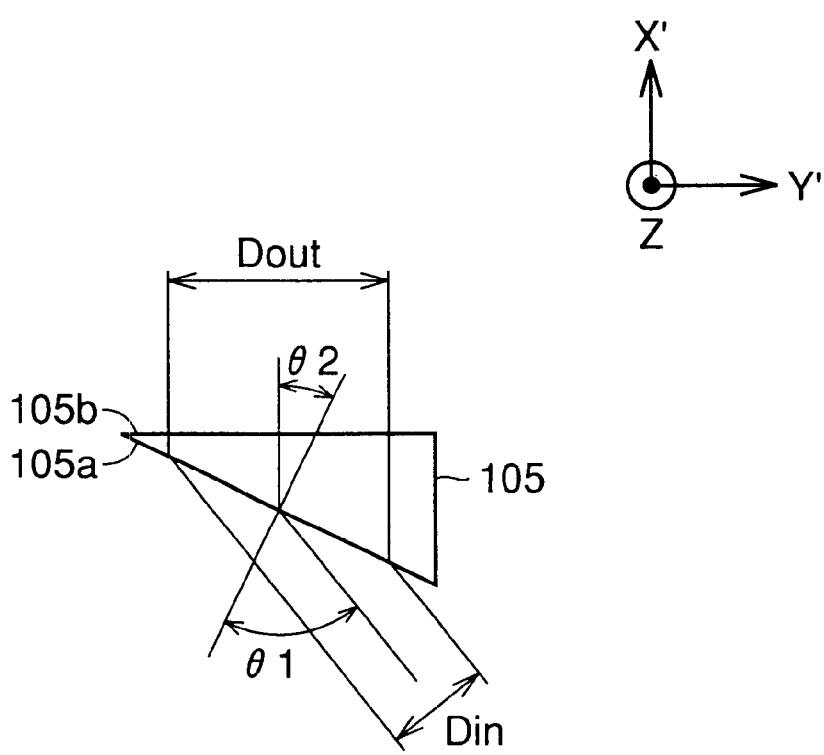
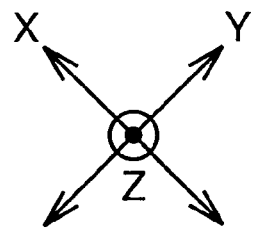
FIG.15
PRIOR ART

OPTICAL PICKUP DEVICE

BACKGROUND OF THE INVENTION

1. Field of the Invention

The present invention relates to optical pickup devices forming a microspot on an information recording medium to optically densely record and reproduce information.

2. Description of the Background Art

In recent years, large capacities of data such as digital still pictures and moving pictures are increasingly used as multimedia advances. In general, such data is stored in a large-capacity recording medium such as optical discs and randomly accessed and reproduced as required. An optical disc is randomly accessible and has a recording density higher than magnetic recording media such as floppy discs. Furthermore, magneto-optical discs, which are rewritable, can be used as a recording medium as above. Most of such magneto-optical discs have an information recording layer with convex and concave portions referred to as lands and grooves, respectively, used as a tracking guide.

Such recording media as optical discs and magneto-optical discs are increasingly adapted to record data densely to be able to record larger capacities of data. For example a medium would have a track pitch reduced to increase a linear density in the direction of the track or have a minimal mark length reduced to enhance its recording density in its tangential direction to record data densely.

Furthermore, even if a highly efficient data compression system such as MPEG2 is used to record and reproduce moving pictures of high quality, the system is still required to transfer data at as high a rate as 10 Mbps to 20 Mbps. To record such a moving picture at real-time while an impact or the like has caused a servo to be displaced, such system must record it at at least 1.5 times the above data transfer rate. Accordingly the optical disc of interest must be rotated faster to increase linear velocity. A higher linear velocity entails a higher recording power and this requires that light availability, i.e., an optical output from an objective lens that originates from an optical output from a light source, be maximized.

Furthermore, for potable applications, recording media are increasingly adapted to have smaller sizes and optical pickup devices are accordingly required to have smaller sizes (in weight and volume).

Thus to accommodate a recording medium of large capacity and high transfer rate an optical pickup device is required to minimize in size a spot converged and thus formed on the recording medium and ensure a recording power of high output. Furthermore, as recording media are miniaturized optical systems are also required to be miniaturized.

Such optical pickup devices in general use semiconductor laser as their optical source. As shown in FIG. 14, a semiconductor laser 101 currently put to use varies in angle of divergence in the y direction in the x-y plane parallel to a surface 101c joining laser chips 101a and 101b together and in the z direction in the x-z plane perpendicular to joint surface 101c. An AlGaInP-based semiconductor laser of approximately 650 nm in wavelength provides an angle of divergence of approximately eight degrees in the y direction and an angle of divergence of approximately 24 degrees in the z direction, as represented in full width half maximum, and a region having a uniform optical intensity in a cross section in the y-z plane perpendicular to an optical axis of a light beam has an elliptic pattern with its shorter and longer axes corresponding to the y and z directions, respectively. If ellipticity is defined by a ratio of a diameter in the longer axis's direction to that in the shorter axis's direction, then the AlGaInP-based semiconductor laser would have an ellipticity of three.

Furthermore a GaN-based semiconductor laser of approximately 400 nm in wavelength that is currently being developed would have a further increased ellipticity of approximately four.

Furthermore, while a light emitted from semiconductor laser 101 in general polarizes in a direction parallel to joint surface 101c or the y direction, a light emitted from semiconductor laser 101 for example of approximately 635 nm in wavelength can polarize in a direction perpendicular to joint surface 101c or the z direction.

Recording a larger capacity of data on a recording medium can be achieved simply by minimizing the area of a spot converged on the recording medium and optimizing the recording medium's track pitch and shortest mark length to match the shape of the converged spot. A converged spot has its area minimized when it is a round spot with its diameter corresponding to diffraction limited. Two techniques can be used to obtain such round, converged spot from a light beam having an elliptic cross section.

The first technique uses beam shaping means such as a shaping prism to allow a light beam incident on an objective lens to have an isotropic intensity distribution. Reference will now be made to FIG. 15 to describe the shaping prism's operation. Shaping prism 105 has a receiving side, with the FIG. 14 xyz coordinate system considered, and an outputting side, with an x'y'z coordinate system considered. The x' axis is adapted to be parallel to an optical axis of a light beam emerging from shaping prism 105. One coordinate system corresponds to the other coordinate system with the x and y axes rotated around the z axis by a predetermined angle.

When shaping prism 105, in the form of a wedge, receives a collimated light beam having a diameter Din (Y) in the y direction and a diameter Din (Z) in the z direction, incident on a plane of incidence 105a at an angle of θ1, the light beam is refracted at an angle of refraction θ2. If shaping prism 105 is formed of a material having an index of refraction n then the following relationship is established:

$$\sin(\theta 1) = n \times \sin(\theta 2).$$

The refracted light beam is incident on a plane of emergence 105b perpendicularly and it is thus not refracted at the plane of emergence 105b and emerges in the form of a collimated beam having a diameter Dout (Y').

Thus, diameter Din (Y) in the y direction is increased by shaping prism 105 by Dout (Y').

In contrast, diameter Din (Z) in the z direction is not shaped by shaping prism 105 and thus emerges from shaping prism 105 as it is, i.e., Dout (Z)=Din (Z).

Furthermore the beam's direction of emergence is polarized relative to its direction of incidence in the x-y plane by a predetermined angle.

Herein the ratio of Dout to Din defines shaping-ratio. For example an elliptic cross section of an ellipticity of three can be converted to a round cross section by setting the shape and index of refraction of shaping prism 105 and the angle of incidence θ1 and the angle of refraction θ2 to set a shaping ratio equal to the ellipticity of three to increase its diameter in the shorter axis's direction three times.

More specifically, a light beam having a wavelength of 655 nm and shaping prism 105 formed of BK7 result in an index of refraction of 1.51389. As such, with a θ1 of 75.13 degrees and a θ2 of 39.68 degrees, shaping prism 105 having the plane of incidence 105*a* and the plane of emergence 105*b* forming an angle of 39.68 degrees can provide the shaping ratio of three.

The second technique uses only a portion of a light beam having an elliptic cross section that is close to the optical axis and has an isotropic intensity distribution. This can be implemented by increasing a focal length of a collimator lens to reduce an effective NA (i.e., a radius of an effective aperture of an objective lens that is divided by a focal length of a collimator lens) to 0.1 or therebelow.

Optical pickup devices corresponding to the first and second techniques are configured as will be described below:

As a first conventional example, FIG. 16 shows an optical pickup device employing a shaping prism corresponding to the first technique to shape a beam. In the figure, semiconductor laser 101 emits an anisotropic light beam which then proceeds as a P polarization via a diffraction element 102 and is then incident on a collimator lens 104 in the form of a divergent beam of light having an elliptic cross section with its longer axis extending in the z direction. The divergent beam is collimated by collimator lens 104 and thus provided as a collimated light beam still having an elliptic cross section. The collimated light beam is incident on shaping prism 105, with its optical axis tilted, and at the prism's plane of incidence 105*a* it is rounded and refracted and thus incident on a polarized-beam splitter 103 in the form of a collimated light beam having a round cross section of an ellipticity of one.

The collimated light beam round in cross section is transmitted through polarized-beam splitter 103 and then converged by objective lens 106 onto an optical disc (magneto-optical disc) 107. Optical disc 107 provides a reflection of the light converged thereon which has been magneto-optically affected and thus has a plane of polarization rotated to provide the reflection in the form of a light beam containing an S polarization component. This light beam proceeds again via objective lens 106 towards semiconductor laser 101 and is thus incident on polarized-beam splitter 103.

Polarized-beam splitter 103 transmits and reflects light reflected from optical disc 107. The light transmitted through polarized-beam splitter 103 is passed via shaping prism 105 and collimator lens 104 and thus incident on diffraction element 102 having a surface 102*a* with a diffraction grating 121 formed thereon for generating a servo signal. The light beam incident on diffraction element 102 is thus partially diffracted by diffraction grating 121 in the y direction and thus incident on a photodetector 108, which in turn provides an output from which a focus error signal (FES) and a tracking error signal (TES) are detected.

Diffraction element 102 has a surface 102*b* provided with a diffraction grating 120 for generating three beams. If a diffracted light from diffraction grating 121 passes through diffraction grating 120, it is accordingly diffracted and its quantity of light is accordingly reduced. This causes a servo signal to be offset. As such, diffraction element 102 is adapted to have a sufficient thickness to prevent a diffracted light from diffraction grating 121 from being incident on diffraction grating 120.

Diffraction element 102 is adhered to and thus fixed on an upper surface of a package accommodating semiconductor laser 101 and photodetector 108, to form an integrated unit referred to as a hologram laser 112.

Furthermore a light reflected from optical disc 107 that is reflected by polarized-beam splitter 103 is separated by Wollaston prism 109 into a P polarization component and an S polarization component, which in turn have their optical paths bent by a prism mirror 113 and their respective spot sizes adjusted by a convex lens 114 and thus converge in two spots on a light receiving surface of a photodetector 111. The two signals can be operated on to provide their differential signal to detect a high-quality, magneto-optical signal having cancelled a noise component such as a variation in the reflectance of optical disc 7.

Wollaston prism 109 is formed by joining together two wedge-shaped members formed of a birefringent material such as crystal and lithium niobate and having their respective, crystallographic optical axes in directions set at +45 degrees and −45 degrees, respectively, to the P polarization and thus orthogonal to each other in a plane orthogonal to an optical axis.

Furthermore, as shown in FIG. 16, shaping prism 105, polarized-beam splitter 103, Wollaston prism 109 and prism mirror 113 can be integrated. As such, such components can be can be arranged in a smaller space and also readily adhered and fixed to their base (not shown).

As a second conventional example, FIG. 17 shows an optical pickup device employing the second technique, using only a portion of light in a vicinity of an optical axis. In the figure, semiconductor laser 101 emits an anisotropic light beam, which in turn proceeds as a P polarization via diffraction element 102 and polarized-beam splitter 103 and is then incident on collimator lens 104 in the form of a divergent light beam having an elliptic cross section with its longer axis extending in the z direction and it is then converged by objective lens 106 onto optical disc (magneto-optical disc) 107.

Optical disc 107 provides a reflection of the light converged thereon, which then proceeds again via objective lens 106 and collimator lens 104 towards semiconductor laser 101 and is thus incident on polarized-beam splitter 103.

Polarized-beam splitter 103 transmits and reflects the light reflected from optical disc 107. A light transmitted through polarized-beam splitter 103 is incident on diffraction element 102 having surface 102*b* with diffraction grating 121 formed thereon and the light is thus partially diffracted by diffraction grating 121 in the y direction and thus incident on photodetector 108 providing an output from which an focus error signal and an tracking error signal are detected.

Diffraction element 102 is adhered to and thus fixed on an upper surface of a package accommodating semiconductor laser 101 and photodetector 108, to form an integrated unit referred to as hologram laser 112.

On the other hand, a light reflected from optical disc 107 and then by polarized-beam splitter 103 is separated by Wollaston prism 109 into a P polarization component and an S polarization component, which in turn have their spot sizes adjusted by convex lens 110 and are thus converged in two spots on a light receiving surface of photodetector 111.

Since polarized-beam splitter 103 can be arranged in a divergent flux between semiconductor laser 101 and collimator lens 104, objective lens 106 and collimator lens 104 can be arranged adjacent to each other to provide a miniaturized optical system. Furthermore, while the first conventional example shown in FIG. 16 requires convex lens 114 for converging light on photodetector 111, the second conventional example can use collimator lens 104 also serving to converge light on photodetector 111 to provide a reduced optical path length and hence a further miniaturized optical system.

In the first conventional example, however, while a converged spot has a round shape, in order to ensure sufficient light availability, collimator lens 104 needs to have an effective NA increased to approximately 0.3 and a reduced focal length. Accordingly, collimator lens 104 and semiconductor laser 101 are arranged disadvantageously closer to each other and polarized-beam splitter 103 can thus not be arranged in a converged flux between collimator lens 104 and semiconductor laser 101. In particular, with hologram laser 112 used, diffraction grating 102 arranged in a converged flux renders it further difficult to arrange polarized-beam splitter 103.

Since polarized-beam splitter 103 and other components are arranged in a collimated flux, such components need to have an effective aperture covering the size of the collimated flux and thus be increased in size, and convex lens 114 is also required for converging light on photodetector 111. This disadvantageously increases the size of the optical system of interest.

In the second conventional example, light availability is extremely reduced since to obtain a round converged spot a collimator lens has an effective NA reduced to 0.1 or therebelow to use only a portion of a flux obtained in a vicinity of an optical axis. This example can be adopted if it is solely used for reproducing information and there is sufficient margin in light availability, although its low light availability must be compensated for by accordingly, excessively increasing the semiconductor laser's output and its power consumption can thus not be reduced.

If the collimator lens has its numerical aperture increased to approximately 0.2 to ensure sufficient light availability, an elliptic converged spot and hence a poor focus would result and the example can thus not accommodate increasing the density of the recording medium of interest. As such in the second conventional example there is a trade-off relationship between obtaining a round converged spot and obtaining increased light availability and they can hardly be obtained simultaneously.

The present invention has been made to overcome such disadvantage as above, ensuring sufficient light availability while providing a converged spot sufficiently reduced in diameter and a device reduced in size.

SUMMARY OF THE INVENTION

In accordance with the present invention an optical pickup device includes a semiconductor laser; a collimator lens converting to a collimated flux a divergent flux emitted from the semiconductor laser; beam shaping means converting a ratio between shorter and longer diameters of an elliptic cross section of the collimated flux formed by the collimator lens; and an objective lens converging on an information recording medium the flux output from the beam shaping means, and receiving a flux reflected from the information recording medium; wherein the beam shaping means shapes a beam to allow the flux output therefrom to have an elliptic cross section having a ratio between shorter and longer diameters of no more than two.

Thus a light beam incident on the objective lens can have an improved ellipticity to allow a converged spot to effectively have an area stopped down, reduced to be substantially equal to an area of a beam spot shaped completely round in cross section.

The present invention preferably includes light separation means separating the flux reflected from the information recording medium in a direction of the semiconductor laser and in a direction different from the direction of the semiconductor laser, and a diffraction element diffracting the flux reflected from the information recording medium and directing the diffracted flux to a photodetector, wherein the light separation means and the diffraction element are arranged in an optical path extending between the collimator lens and the semiconductor laser.

In present invention, preferably the beam shaping means increases the shorter diameter of the elliptic cross section to shape a beam.

In the present invention, preferably the beam shaping means reduces the longer diameter of the elliptic cross section to shape a beam.

In the present invention, preferably the diffraction element and the light separation means are spaced by a set range of 0.5 mm to 2.0 mm and the light separation means and the collimator lens are spaced by a set range of 0.5 mm to 2.5 mm.

In the present invention, preferably the beam shaping means diffracts a beam at least twice to shape the beam.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows a positional relationship between an optical disc 7 used in the FIG. 1 optical pickup device, a track on the optical disc and three beams.

FIGS. 10A–10C show a configuration of a hologram laser 12 of the FIG. 9 optical pickup device.

FIGS. 11A and 11B illustrate a light receiving portion of the FIG. 9 optical pickup photodetector 11.

FIG. 15 is a view for illustrating an action of a shaping prism.

DESCRIPTION OF THE PREFERRED EMBODIMENTS

First Embodiment

In accordance with the present invention a first embodiment will now be described with reference to FIGS. 1–7.

Figure 1:
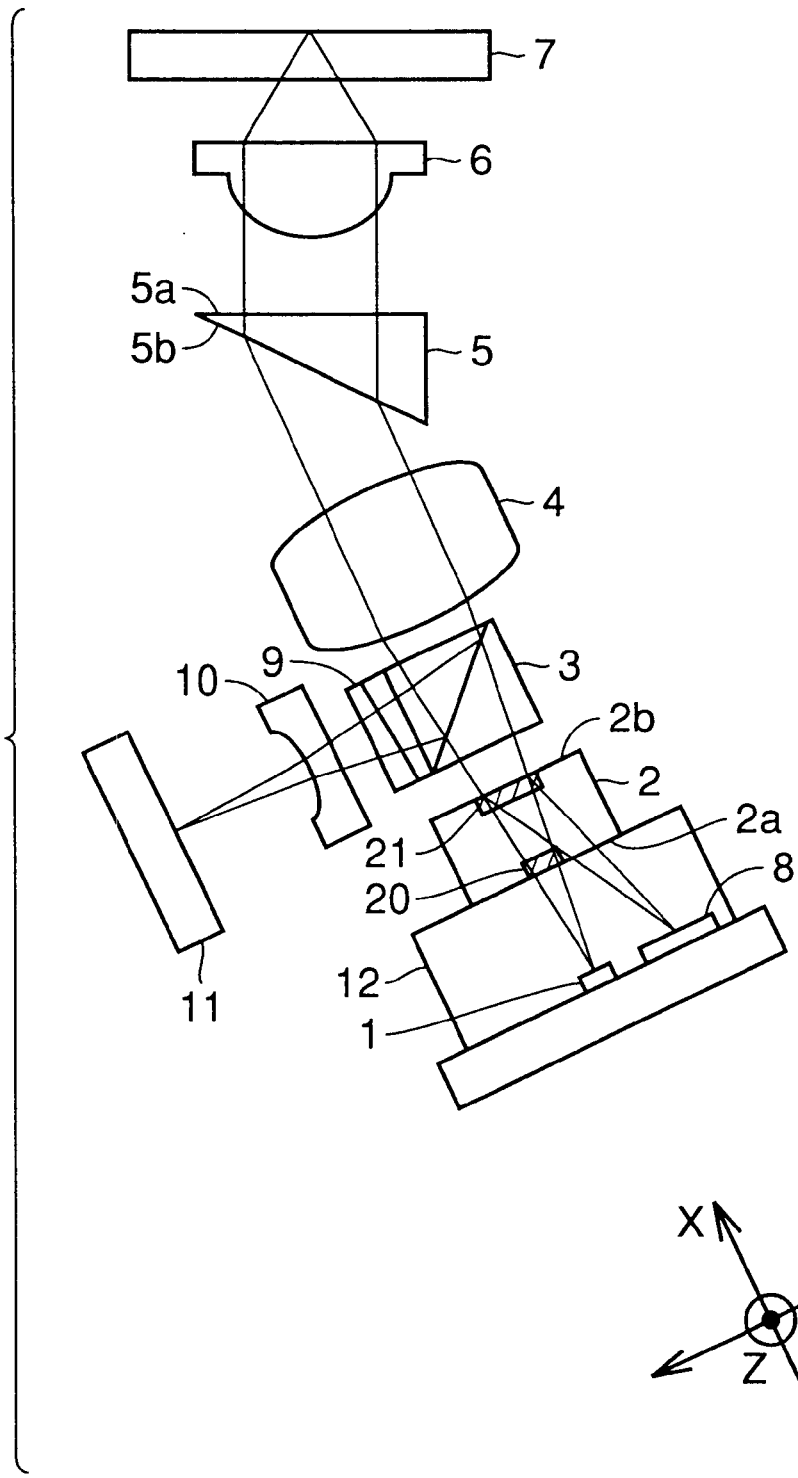
FIG. 1 shows an arrangement of an optical pickup device according to one embodiment of the present invention.

FIG. 1 shows an arrangement of an optical pickup device used in the present embodiment. In the figure, a semiconductor laser 1 emits an anisotropical light beam, which then proceeds as a P polarization via a diffraction element 2 and a polarized-beam splitter 3 and is thus incident on collimator lens 4 in the form of a divergent light beam having an elliptic cross section with its longer axis extending in the z direction and it is thus collimated by collimator lens 4 though it still has an elliptic cross section.

The collimated light beam is then incident on a shaping prism 5, with its optical axis tilted. The beam is refracted at the prism's plane of incidence 5a and has its elliptic cross section corrected in ellipticity and it thus emerges from the plism's plane of emergence 5b. The collimated light beam is then converged by an objective lens 6 onto an optical disc 7. In the following description an example will be described using a magneto-optical disc as optical disc 7.

A beam of linearly polarizing light incident on optical disc 7 is magneto-optically affected when it is reflected by optical disc 7. As a result its plane of polarization is rotated and it thus proceeds again via an objective lens 6 and shaping prism 5 towards semiconductor laser 1 in the form of a light beam containing an S polarization component. At shaping prism 5 the beam, on its second half route, is reversely affected as compared to that on the first half route and thus again has an elliptic cross section having its original ellipticity and is then converged by collimator lens 4 and thus incident on polarized-beam splitter 3. A light beam transmitted through polarized-beam splitter 3 is in turn incident on diffraction element 2 having a surface 2b with a diffraction grating 21 formed thereon and it is thus diffracted by diffraction grating 21 in the y direction and thus incident on photodetector 8.

On the other hand, a light beam reflected by polarized-beam splitter 3 is in turn separated by Wollaston prism 9 into a P polarization component and an S polarization component and thus provided in two light beams. Then they have their spot diameters adjusted by a concave lens 19 and are thus incident on photodetector 11. Diffraction element 2 has a surface 2a with a diffraction grating 20 formed thereon for forming three beams for generating a tracking error signal. As such, six light beams are in effect incident on photodetector 11. Furthermore, although it is not shown, a mirror may be arranged between shaping prism 5 and objective lens 6 to bend an optical path in the z direction to reduce the device in thickness.

Figure 2A:
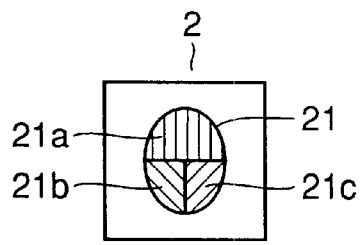
FIGS. 2A–2C show a configuration of a hologram laser 12 of the FIG. 1 optical pickup device.
Figure 2B:
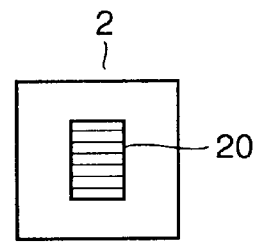
Figure 2C:
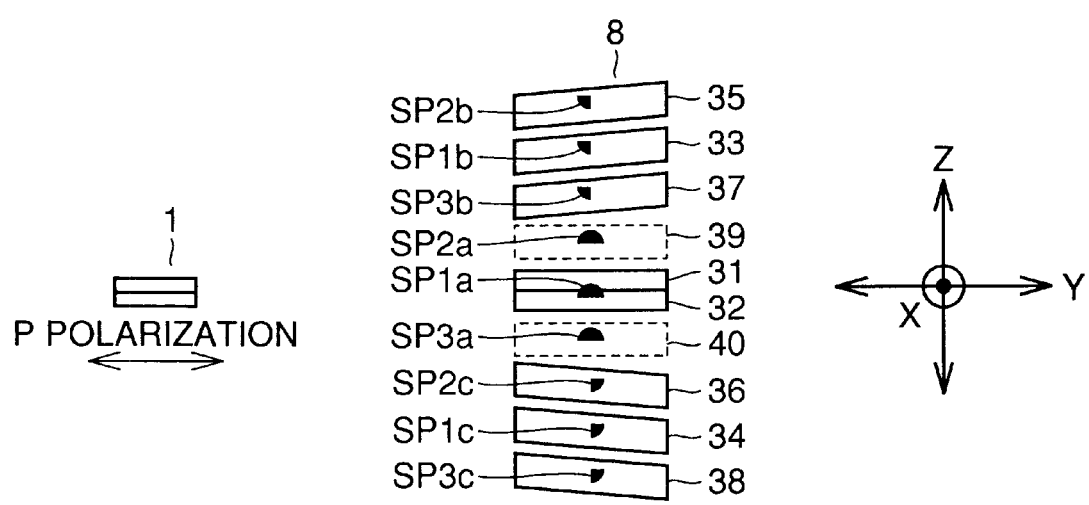

FIGS. 2A–2C illustrate a configuration of hologram laser 12 of the optical pickup device, with the x axis (an optical axis) extending in a direction perpendicular to the plane of the figure. FIG. 2A shows diffraction grating 21 formed on that surface of diffraction element 2 closer to the objective lens, a surface 2b, for generating a servo signal. diffraction grating 21 is divided by a line in the y direction and that in the z direction and thus formed of three regions 21a, 21b, 21c. Considering that a beam is shaped, diffraction grating 21 is shaped to have an elliptic pattern omitting any unnecessary regions. However, it may be have a pattern obtained by cutting a round pattern at its right and left sides to provide straight sides.

FIG. 2B shows diffraction grating 20 formed on that surface of diffraction element 2 closer to the semiconductor laser, a surface 2a, for generating three beams. Diffraction grating 20, formed of linear grating patterns extending substantially in the y direction and arranged in the z direction, receives a light beam emitted from semiconductor laser 1 and diffracts the light beam in the z direction and thus generates three beams on optical disc 7. As shown in FIG. 4, optical disc 7 is illuminated with one main beam MB and two subbeams SB1 and SB2.

FIG. 2C shows a configuration of a light receiving portion of photodetector 8 and a positional relationship between photodetector 8 and semiconductor laser 1. Photodetector 8 is arranged to have its center positioned offset from semiconductor laser 1 in the y direction by approximately 1.2 mm. photodetector 8 is formed of ten light receiving portions 31–40.

Main beam MB reflected from disc 7 that is diffracted at region 21a provides a spot SP1a incident on a boundary of light receiving portions 31 and 32, and Main beam MB reflected from disc 7 that is diffracted at regions 21b and 21c provides spots SP1b and SP1c incident on light receiving portions 33 and 34, respectively. Subbeam SB1 reflected from disc 7 that is diffracted at regions 21a, 21b, 21c provides spots SP2a, SP2b, SP2c incident on light receiving portions 39, 35, 36, respectively, and Subbeam SB2 reflected from disc 7 that is diffracted at regions 21a, 21b, 21c provides spots SP3a, SP3b, SP3c incident on light receiving portions 40, 37, 38, respectively.

If A–J represent signals output from light receiving portions 31–40, then according to the Foucault method a focus error signal (FES) is detected by the operation:

$$FES = B - A$$

and according to the DPP method a tracking error signal (TES) is detected by the operation:

$$TES = (D-C) - k1 \times \{\{H-G\} + k2 \times (F-E)\}$$

wherein k1 and k2 are circuit constants for adjustment of gain balance. In the above operations, outputs I and J are not used and light receiving portions 39 and 40 indicated by broken lines can thus be dispensed with. Furthermore, the light receiving portion is adapted to have a generally radial shape, since if the semiconductor laser varies in oscillation frequency a diffracted light can move and vary in shape. In general, semiconductor laser has a wavelength and optical output susceptible to ambient temperature. For example, as temperature rises a laser's oscillating frequency shifts to a longer wavelength. Furthermore, with an optical element acting to diffract light, as has been described above, a varied wavelength would result in a varied angle of diffraction and hence an altered position of diffracted light.

Furthermore, while main beam MB and subbeams SB1 and SB2 are set to be spaced in a tracking direction (the y direction) by one half of a track pitch suitable for the DPP method, as shown in FIG. 4, if they are spaced by one fourth of a track pitch suitable for a 3-beam method a TES can be detected by the 3-beam method. In this example, it can be detected simply by the operation:

$$TES = (E+F+I) - (G+H+J).$$

If the 3-beam method is used, neither light receiving portion 39 nor 40 can be dispensed with. If two types of discs, one approximately twice greater in track pitch than the other, are compatibly reproduced, the TES operation can be switched to apply the 3-beam method to the optical disc of the larger track pitch and the DPP method to that of the smaller track pitch to track the two types of discs.

Figure 3A:
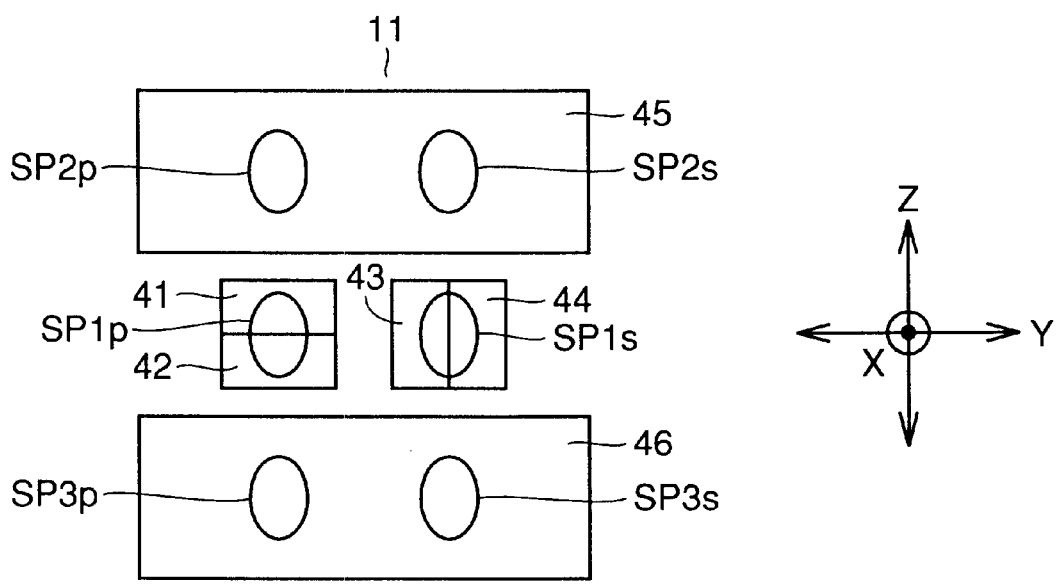
FIGS. 3A and 3B illustrate a light receiving portion of the FIG. 1 optical pickup photodetector 11.
Figure 3B:
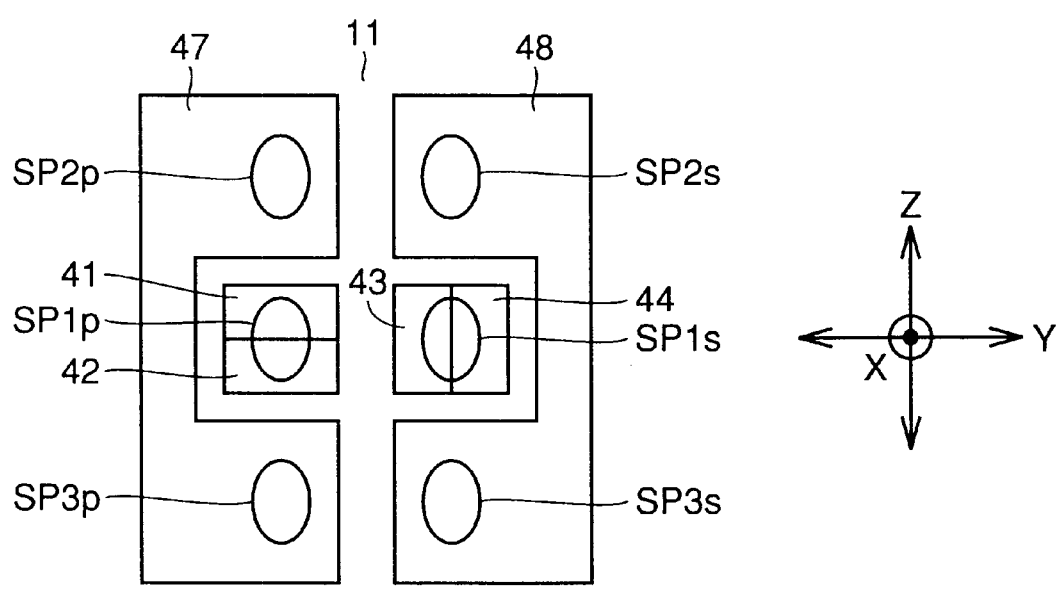

FIGS. 3A and 3B illustrate a shape of a light receiving portion of photodetector 11. As shown in FIG. 3A, photodetector 11 has six light receiving portions 41–46. As shown in FIG. 4, optical disc 7 is illuminated with main beam of light MB and subbeams of light SB1 and SB2. Optical disc 7 reflects the light, which is in turn divided by Wollaston prism 9 in two, a P polarization component and an S polarization component. Thus, six spots SP1p, SP1s, SP2p, SP2s, SP3p, SP3s are incident on photodetector 11. Shaping prism 5 acts to shape a spot in an ellipse having a longer axis extending in the z direction.

Spots SP1p and SP1s, corresponding to main beam MB, are incident on a boundary of light receiving portions 41 and 42 and that of light receiving portions 43 and 44, respectively. Spots SP2p and SP2s, corresponding to subbeam SB1, are incident on light receiving portion 45. Spots SP3p and SP3s, corresponding to subbeam SB2, are incident on light receiving portion 46.

Photodetector 11 is positioned in the z direction through a positional adjustment to allow light receiving portions 41 and 42 to provide their respective outputs equal in level and it is also positioned in the y direction through a positional adjustment to allow light receiving portions 43 and 44 to provide their respective outputs equal in level. In effect, it is only spots SP1p and SP1s corresponding to main beam MB that are required for detecting a magneto-optical signal. However, a magneto-optical signal contains a signal having a high frequency of approximately 10 MHz, and to accommodate this signal bandwidth, light receiving portions 41–44 are adapted to have an extremely reduced area. In reproducing a signal, to read information optical disc 7 is rotated faster than in recording a signal and a signal bandwidth of at least 20 MHz is accordingly required. As such, only with light receiving portions 41–44 having a small light receiving area, it is difficult to provide initial adjustment of the positional relationship between light receiving portions 41–44 and spots SP1p and SP1s. Accordingly, light receiving portions 45 and 46, which are not used for detecting a magneto-optical signal and are thus allowed to have a large area, are provided to allow the spots corresponding to subbeams SB1 and SB2 to be incident on light receiving portions 45 and 46 to facilitate the initial adjustment. If main beam MB and subbeams SB1 and SB2 are spaced in a tracking direction by approximately one fourth of a track pitch, in the 3-beam method a TES can be detected from a differential signal between light receiving portions 45 and 46. In this example, hologram laser 12 can dispense with the TES detection function and photodetector 8 can have a reduced number of light receiving portions.

FIG. 3B is a variation of photodetector 11, replacing light receiving portions 45 and 46 with light receiving portions 47 and 48 on which spots SP2p and SP3p and spots SP2s and SP3s are incident, respectively. In this variation also, light receiving portions 47 and 48 having a large area can be used to facilitate the above initial adjustment, although the 3-beam method cannot be applied to provide the TES signal operation.

FIG. 4 illustrates an arrangement of optical disc 7 used in an optical pickup device, a track on optical disc 7, and three beams. Optical disc 7 includes a substrate 70 having a back surface 7b with concave and convex portions formed therein corresponding to two forms of a groove 71 and a land 72 to form a track. Information are recorded and reproduced in both of groove 71 an land 72. Groove 71 and land 72 are paired to provide a guide track 73 and a track pitch is defined by a spacing between guide tracks. A light beam is incident on substrate 70 at a surface 7a and converged onto groove 71 or land 72 to record and reproduce information.

On disc 7 a magneto-optical signal is recorded and reproduced as described below: In the FIG. 1 optical pickup device, semiconductor laser 1 is engaged to provide an emission at high output in the form of a pulse synchronous with a clock signal and objective lens 6 forms a light spot on optical disc 7 to heat to at least a predetermined temperature a minute region of the disc's recording film of magneto-optical material. This elevation of temperature forms in the recording film a heated region which has lost coercive force. To such region is applied an external magnetic field caused by a magnetic head (not shown) arranged opposite to objective lens 6 with optical disc 7 interposed. When the heated region cools to normal temperature, the current direction of magnetization of the recording film is fixed and thus recorded in the direction of the external magnetic field.

In reproducing a signal, semiconductor laser 1 is engaged to provide an emission at an output lower than in recording the signal, to illuminate the recording film. A beam of linearly polarized light is incident on the recording film and reflected, magneto-optically affected and thus having a plane of polarization rotated in a direction, which varies depending on the current direction of magnetization of the recording film. Such variation in polarization is converted by an analyzer (Wollaston prism 9) into a variation in quantity of light and thus detected by photodetector 11. Furthermore, on the recording film there can be formed a reproducing film in which only a region heated over a predetermined temperature can be magnetized in the same direction as the recording film while the other regions can have an inner surface magnetized and thus block the information on the magnetization of the recording film to reproduce the information of a region smaller than a light spot.

With specific values provided, FIGS. 1–4 can be described as follows: Objective lens 6 has a numerical aperture (NA) of 0.65 and a focal length of 2 mm, and semiconductor laser 1 has a wavelength of 655 nm and an angle of radiation (full width half maximum) of eight degrees in the y direction and that (full width half maximum) of 24 degrees in the z direction. Polarized-beam splitter 3 is provided with a polarization film transmitting and reflecting 75% and 25% of a P polarization, respectively, and reflecting 100% of an S polarization. Diffraction grating 20 has a grating so set that the intensity ratio of a main beam to a subbeam stands at ten to one. Diffraction grating 21 has a grating set to have a diffraction efficiency of 80% for a zero-order diffracted beam and a diffraction efficiency of 8% for a first-order diffracted beam. Wollaston prism 9 is two, joined wedge-shaped members of lithium niobate, allowing their crystallographic optical axes extending orthogonal to each other in a plane orthogonal to an optical axis and also forming an angle of 45 degrees with respect to a P polarization.

The optical disc has substrate 70 of 0.5 mm in thickness, with groove 71 of approximately 55 nm in depth, a track pitch of 1.04 $\mu$m, groove 71 and land 72 each having a width of approximately 0.52 $\mu$m. On such disc a signal having a shortest mark length of approximately 0.18 $\mu$m is recorded.

On photodetector 7 a spot has an elliptic shape with its longer axis extending in the y direction since a spot incident on objective lens 6 is not completely round. However, it has a shape better than when an ellipticity obtained from semiconductor laser 1 is not shaped, and it has for example a diameter of 0.94 $\mu$m in the y direction and that of 0.83 $\mu$m in the z direction.

Since a spot has a diameter in a tracking direction (the y direction) that is larger than a diameter orthogonal thereto, it results in a slightly larger cross talk from an adjacent track than a round spot. As such it is preferable that a slightly wider track pitch be set and a reduced shortest mark length be provided to accommodate high-density recording and reproduction.

Main beam MB and subbeams SB1 and SB2 are spaced by a set distance of 15 μm in the z direction and a distance of 0.52 μm (one half of a track pitch) in the y direction. A beam is shaped in a direction matching the y direction (a tracking direction). Beam-shaping results in three beams having an angle of separation reduced in the y direction. As such a large angle of rotation can be used to adjust a 3-beam adjustment using the hologram laser 12 rotation for placing subbeams SB1 and SB2 on tracks adjacent to main beam MB. Thus the adjustment can be performed with an improved resolution and also less susceptible to an effect of the hologram laser 12 rotation that is attributed to the passage of time.

If a light beam's isometric lines in intensity are used to represent its elliptic cross section, with its ellipticity defined by the ratio of its diameter in the longer axis's direction (the z direction) and that in the shorter axis's direction (the y direction), the aforementioned beam of light emerging from semiconductor laser 1 has an ellipticity of three.

If shaping prism 5 acts to enlarge such beam's diameter, multiplying it in the shorter axis's direction (the y direction) by M, then the beam thus shaped has an ellipticity of 3/M. Herein M represents shaping-ratio. For a condition for each of shaping ratios of 1 (no shaping prism), 1.5, 2, 2.5 and 3, i.e., ellipticities of 3, 2, 1.5, 1.2 and 1 after beam-shaping, the collimator lens 4 effective NA was varied to obtain a converged spot's area and an upper limit of a recording power corresponding to light availability. Note that semiconductor laser 1 had a maximal optical output of 50 mW.

Figure 5:
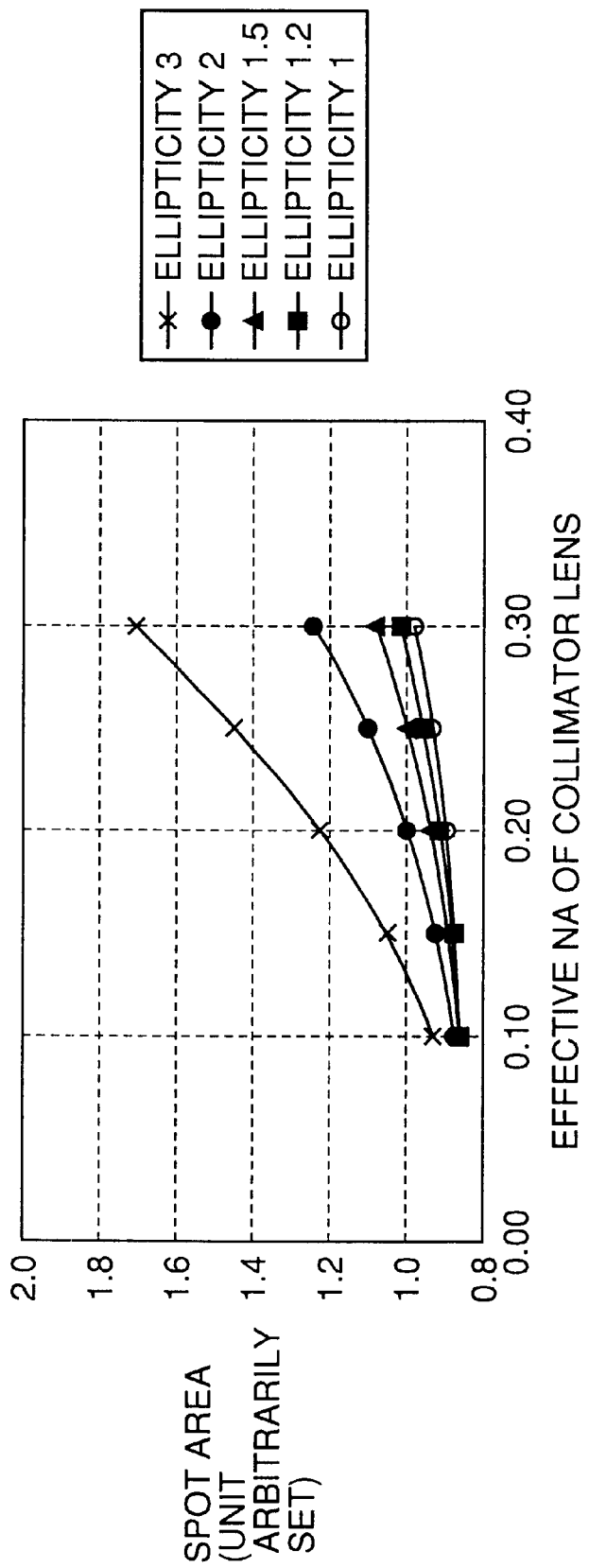
FIG. 5 is a graph of spot area versus effective NA of collimator lens 4.

FIG. 5 is a graph of spot area versus effective NA of collimator lens 4. It is apparent from the graph that as ellipticity is reduced and as the collimator lens 4 effective NA is reduced, spot area is also reduced.

Figure 6:
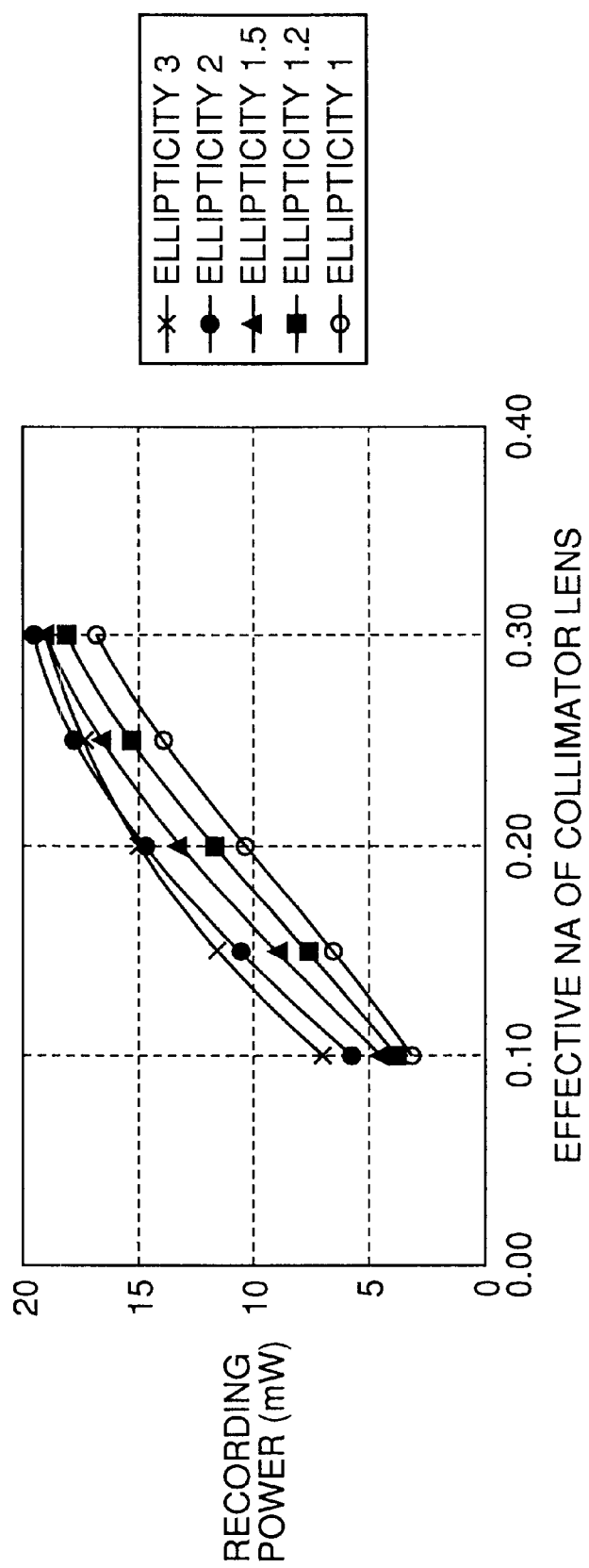
FIG. 6 is a graph of upper limit of recording power versus effective NA of collimator lens 4.

FIG. 6 is a graph of upper limit of recording power versus effective NA of collimator lens 4. It is apparent from the graph that as ellipticity is increased and as the collimator lens 4 effective NA is increased, the recording power's upper limit is also increased.

Figure 7:
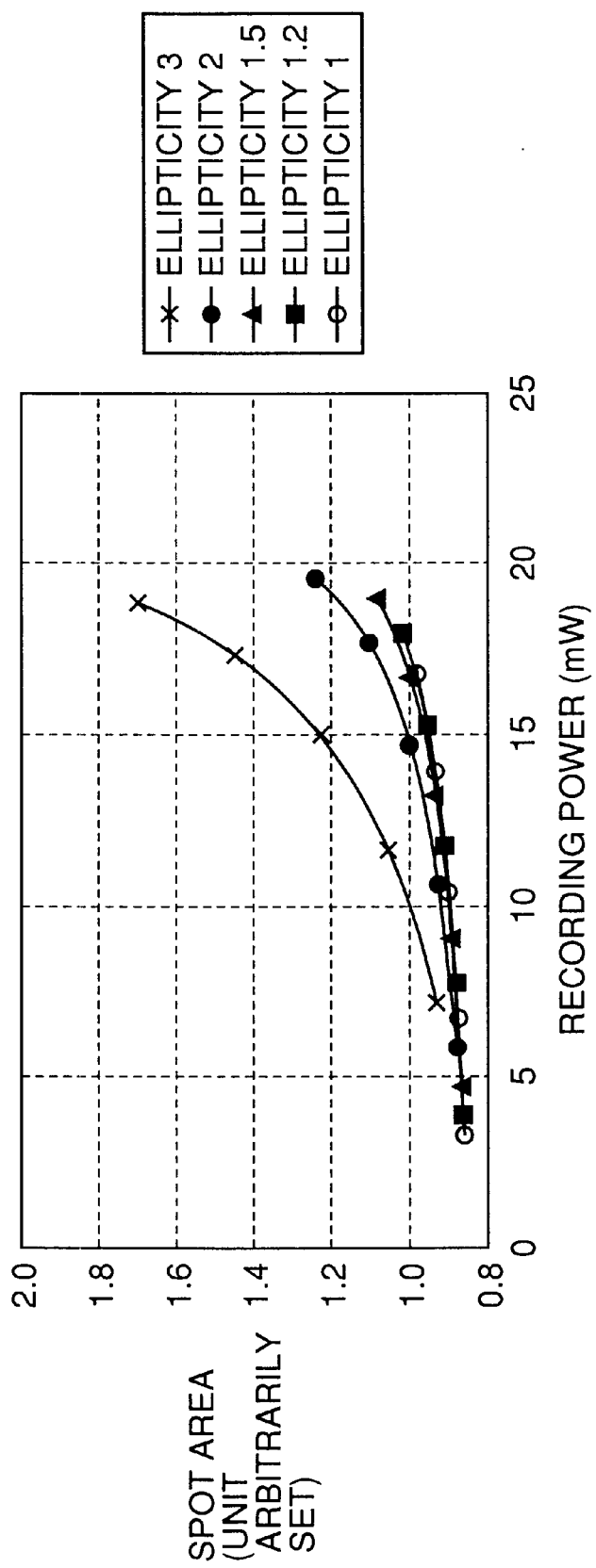
FIG. 7 is a graph of spot area versus upper limit of recording power.

FIG. 7 is a graph of spot area versus upper limit of recording power based on the graphs shown in FIGS. 5 and 6. It is apparent from the graph that a beam shaped to have an ellipticity of no more than two allows a spot area to be extremely smaller than a beam not shaped and thus having an ellipticity of three when such beams are required to ensure the same recording power.

It is also apparent that for ensuring a recording power of 10 mW to 15 mW any ellipticities no more than two can correspond to almost the same spot area.

Thus it is understood that a light beam incident on objective lens 6 need only have an ellipticity set to be no more than two, preferably at least one to at most two.

In contrast, to provide a power of no less than 10 mW, collimator lens 4 has a focal length of no more than 9.0 mm for a shaping ratio of 1.5 (an ellipticity of 2.0 after beam-shaping), a focal length of no more than 7.5 mm for a shaping ratio of 2.0 (an ellipticity of 1.5 after beam-shaping), a focal length of no more than 7.0 mm for a shaping ratio of 2.5 (an ellipticity of 1.2 after beam-shaping), and a focal length of no more than 5.5 mm for a shaping ratio of 3.0 (an ellipticity of 1.0 after beam-shaping), as collectively shown below in Table 1.

TABLE 1

| Ellipticity of Laser | Shaping Ratio | Ellipticity After Beam-Shaping | Focal Length of Collimator Lens (mm) |
| --- | --- | --- | --- |
| 3.0 | 1.0 | 3.0 | |
| 3.0 | 1.5 | 2.0 | 9.0 |
| 3.0 | 2.0 | 1.5 | 7.5 |
| 3.0 | 2.5 | 1.2 | 7.0 |
| 3.0 | 3.0 | 1.0 | 5.5 |

To prevent a diffracted light from diffraction grating 21 from being incident on diffraction grating 20, diffraction element 2 needs to have a thickness of at least 2 mm. Furthermore, in ensuring that polarized-beam splitter 3 and diffraction element 2 are spaced by at least 0.5 mm and that collimator lens 4 and polarized-beam splitter 3 are spaced by at least 0.5 mm, the focal length of 7 mm for the 2.5 shaping ratio (the 1.2 ellipticity after beam-shaping) is the limit of the focal length of the collimator lens. Ensuring that components are spaced by at least 0.5 mm can reliably eliminate their mechanical interference, regardless of their sizes, their errors on a surface on which they are mounted, their movements as temperature varies and time elapses, and the like.

As such it is understood that a light beam incident on objective lens 6 need only have an ellipticity set in a range of 1.2 to 2, preferably 1.5 to 2.

The present embodiment uses a shaping ratio of 1.5 (an ellipticity of two). Collimator lens 4 has a focal length of 7.65 mm and an effective NA of 0.17. Polarized-beam splitter 3 and diffraction element 2 are spaced by approximately 0.8 mm. collimator lens 4 and polarized-beam splitter 3 are spaced by approximately 1.5.

Figure 8:
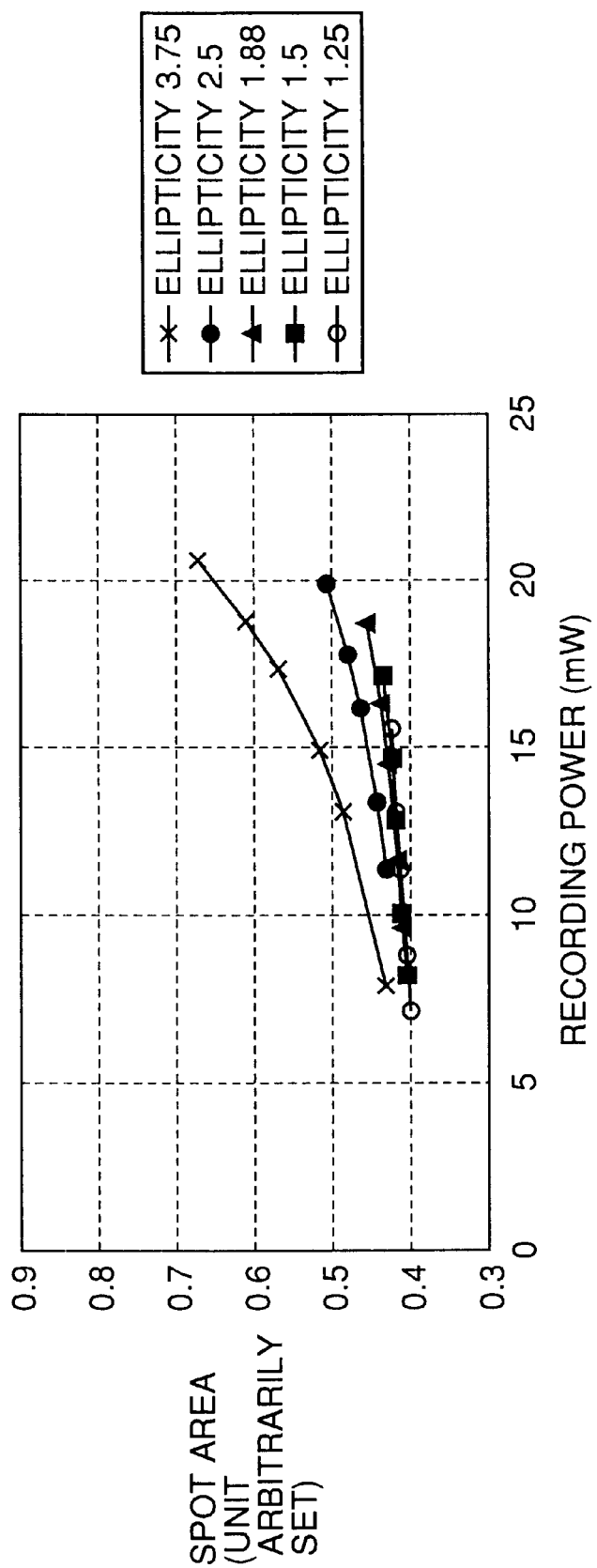
FIG. 8 is another graph of spot area versus upper limit of recording power.

FIG. 8 is a graph of spot diameter versus upper limit of recording-power, with a semiconductor laser 1 of 410 nm in wavelength and 3.75 in ellipticity.

As compared to FIG. 7, it is understood that as wavelength is reduced, spot area is accordingly, generally reduced. It is also understood from this graph that a beam shaped to have a smaller ellipticity allows a spot area to be extremely smaller than a beam not shaped and thus having the ellipticity of 3.75 when they are required to ensure the same recording power.

When ellipticities of no more than 2.5 are examined more closely, it is understood that for the 2.5 ellipticity a spot diameter is not sufficiently reduced even after beam-shaping. For the ellipticities of no more than 1.88 a sufficiently small spot diameter is obtained and there is no ellipticity-dependent variation in spot diameter observed.

Furthermore it is understood that in ensuring a recording power of 10 mW to 15 mW, any ellipticities of no more than 1.88 correspond to substantially the same spot area.

Thus it is understood that a light beam incident on objective lens 6 need only have an ellipticity set in a range of no more than 2.5, preferably no more than 1.88.

The above description is provided in conjunction with a 3-beam optical pickup device forming three beams on optical disc 7. The present invention, however, is also applicable to a 1-beam optical pickup device with diffraction element 2 which does not have diffraction grating 20. In this example, it is not necessary to consider the interference between a diffracted light from diffraction grating 21 and diffraction grating 20. This can provide an advantageously increased degree of freedom in designing diffraction element 2 in thickness.

Second Embodiment

In accordance with the present invention another embodiment will be described with reference to FIGS. 9–12. For the sake of convenience, any member of the present embodiment that has the same function as that of the first embodiment is denoted by a like reference character and will thus not be described. Any characteristics similar to those of the first embodiment will neither be described.

Figure 9:
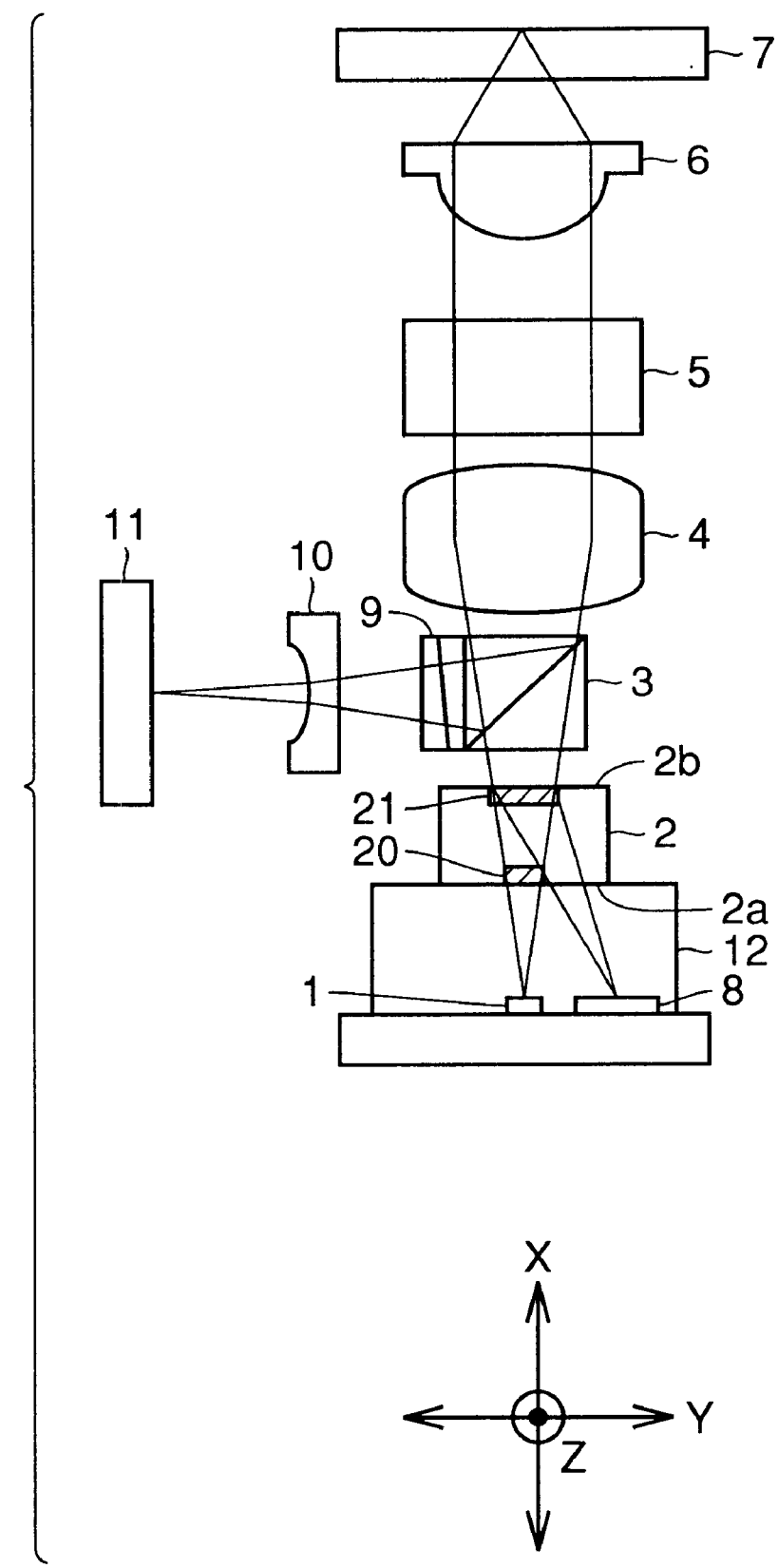
FIG. 9 shows an arrangement of an optical pickup device according another embodiment of the present invention.

The optical pickup device of the present embodiment is configured as shown in FIG. 9. It is configured of the same components as shown in FIG. 1, although it is different in that shaping prism 5 is rotated around an optical axis of objective lens 6 by 90 degrees and thus attached, shaping a beam in the z direction (a tangential direction).

FIGS. 10A–10C illustrate a configuration of hologram laser 12 of the optical pickup device. As shown in FIG. 10C, in the present embodiment it is a configuration which is effective when it is used in combination with semiconductor laser 1 providing a direction of polarization perpendicular to joint surface 1c.

Since because of a polarization characteristic of polarized-beam splitter 3 a P polarization must be set in a predetermined direction, semiconductor laser 1 is rotated by 90 degrees and thus mounted. FIG. 10A shows diffraction grating 21 formed on the diffraction element's surface 2b for generating a servo signal. Since a beam is shaped in a direction rotated by 90 degrees, diffraction grating 21 is also adapted to have an elliptic pattern rotated by 90 degrees and thus having its longer axis extending in the y direction.

FIGS. 11A and 11B illustrate a shape of a light receiving portion of photodetector 11. Since a beam is shaped in a direction rotated from that in the previous embodiment, on the light receiving portion a light beam has an elliptic shape having its longer axis extending in the y direction.

Figure 12:
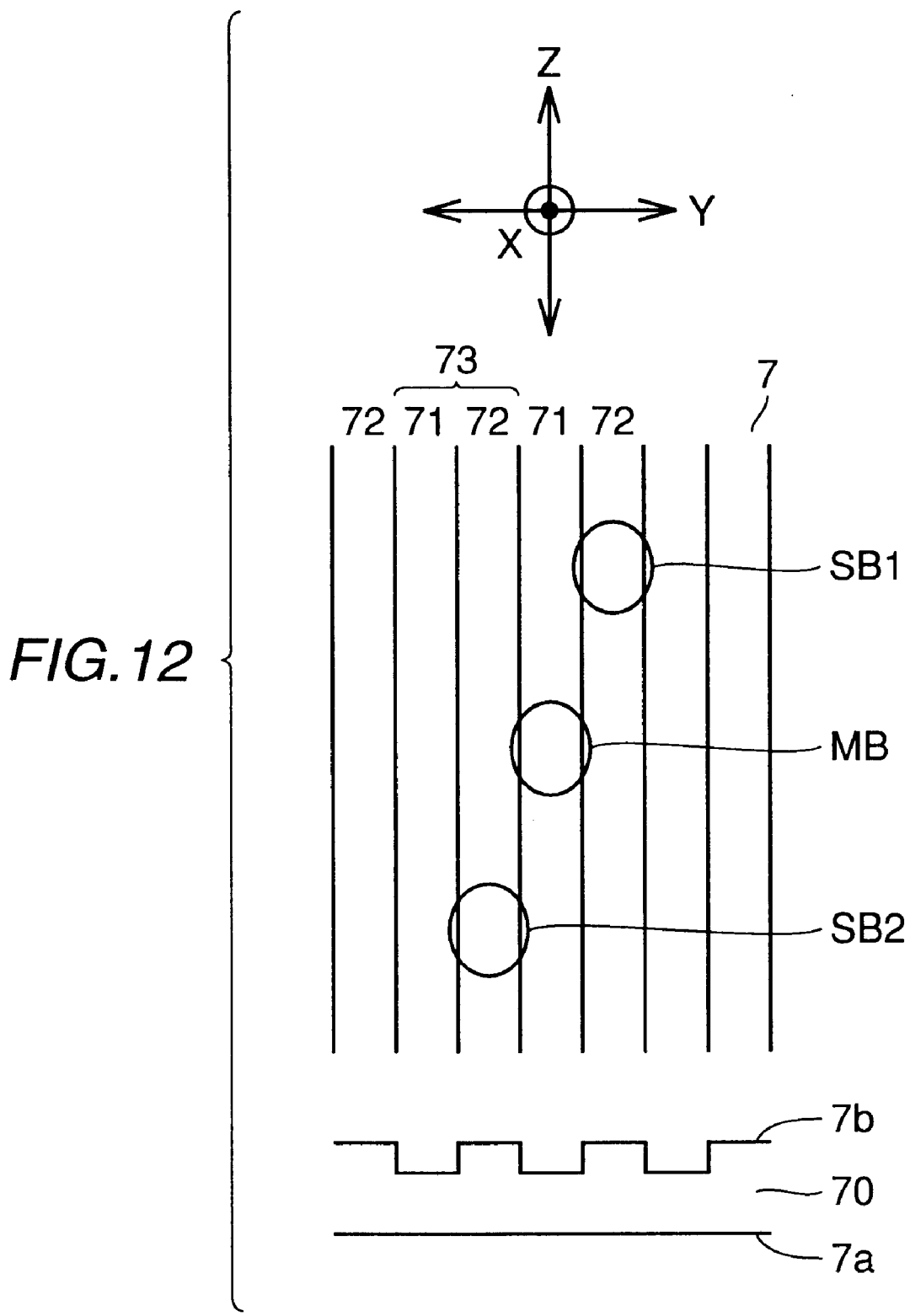
FIG. 12 shows a positional relationship between an optical disc 7 used in the FIG. 9 optical pickup device, a track on the optical disc and three beams.

FIG. 12 shows an arrangement of tracks on optical disc 7 and three beams thereon. As in the previous embodiment, a spot incident on objective lens 6 does not have a completely round shape, and it thus has on optical disc 7 an elliptic shape with its longer axis extending in the z direction. However, it has a better shape than when an ellipticity obtained from semiconductor laser 1 is not shaped, and it has for example a diameter of 0.94 $\mu$m in the z direction and that of 0.83 $\mu$m in the y direction.

Because of the small spot diameter in a tracking direction (the y direction) any cross talk hardly occurs from an adjacent track. Considering the large spot diameter in the tangential direction (the z direction), however, it is desirable that a bit longer, shortest mark length be set. As such, it is preferable that while a bit longer, shortest mark length is set, a reduced track pitch be provided to achieve high-density recording and reproduction.

Main beam MB and subbeams SB1 and SB2 are spaced in the z direction by a set distance of 10 $\mu$m and in the y direction by that of 0.52 $\mu$m (one half of a track pitch). A beam is shaped in a direction matching the z direction (a tangential direction). As such, when a beam is shaped, main beam MB and subbeams SB1 and SB2 approach each other in the z direction by a shaping ratio. As such, for a shaping ratio of 1.5, if on photodetectors 8 and 11 spots are spaced as in the first embodiment, the spots are spaced in the z direction by 1/1.5, or 10 $\mu$m. As spots approach each other closer, an optical pickup device may be mounted with reduced precision to a mechanism (not shown) for delivering the device in a tracking direction. Furthermore, a large variation of angle can be applied to provide a 3-beam adjustment employing the hologram laser 12 rotation in placing a subbeam on a track adjacent to a main beam. Thus the adjustment can be performed with improved precision and also be less susceptible to the passage of time.

Third Embodiment

In accordance with the present invention still another embodiment will be described with reference to FIG. 13, as below. For the sake of convenience, any member of the present embodiment that has the same function as that of the first and second embodiments is denoted by a like reference character and will thus not be described. Any characteristics similar to those of the first and second embodiments will neither be described.

Figure 13:
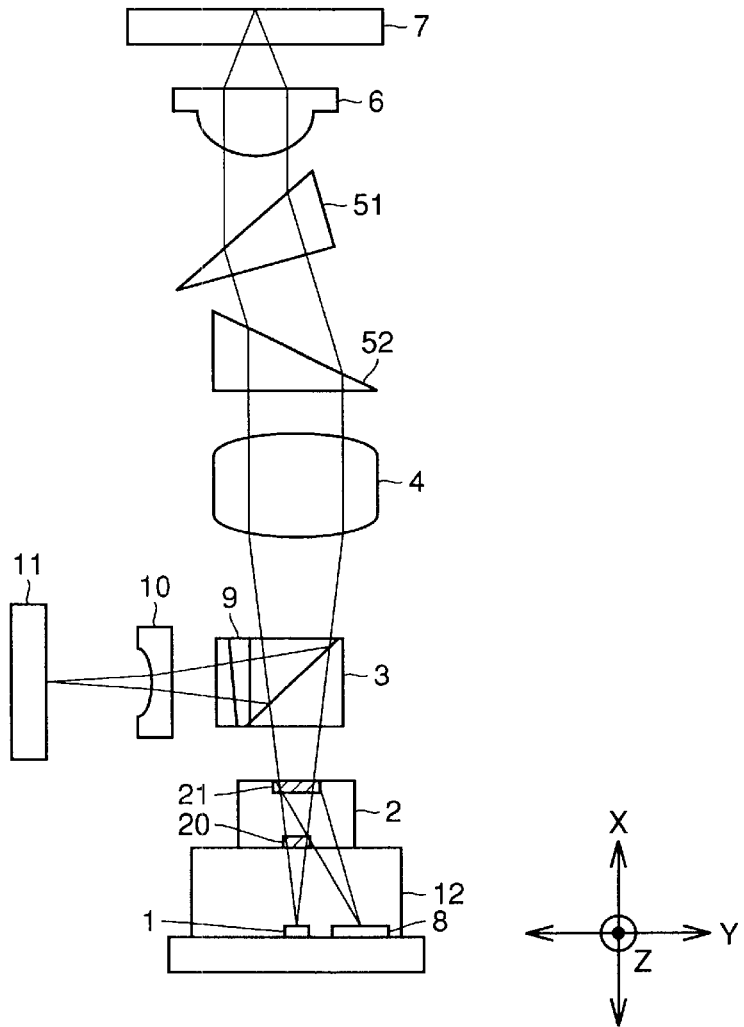
FIG. 13 shows an arrangement of an optical pickup device according still another embodiment of the present invention.
Figure 14:
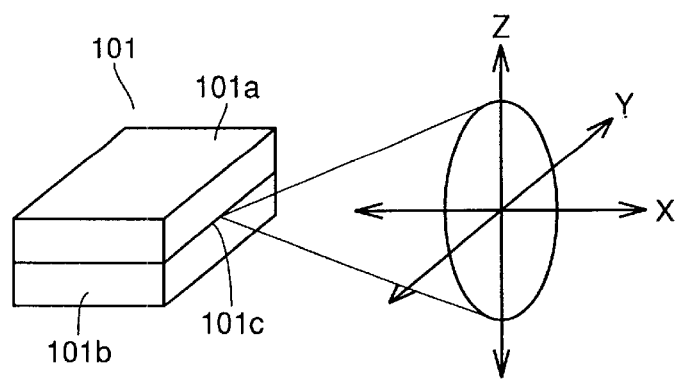
FIG. 14 is a perspective view for illustrating a light beam anisotropically emitted from a semiconductor laser.
Figure 16:
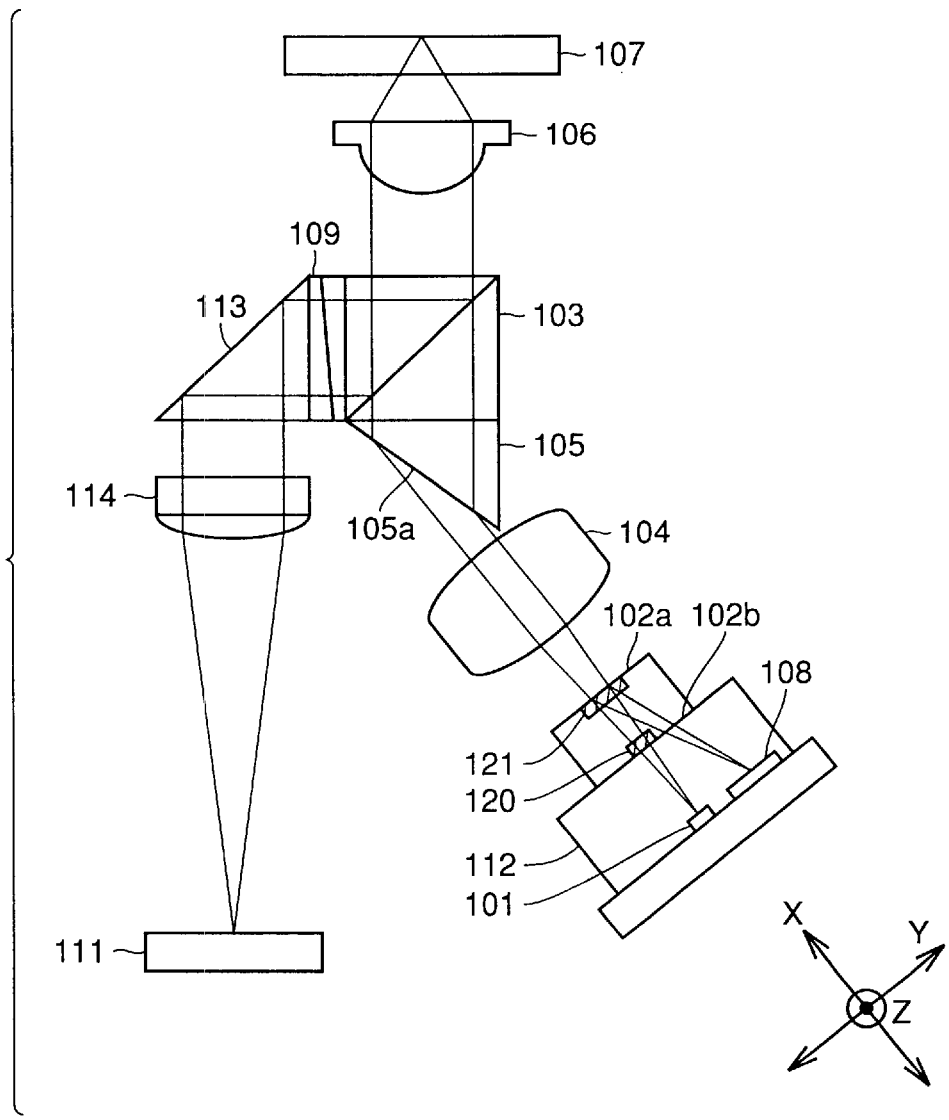
FIG. 16 shows an arrangement of a first conventional example, an optical pickup device shaping a beam.
Figure 17:
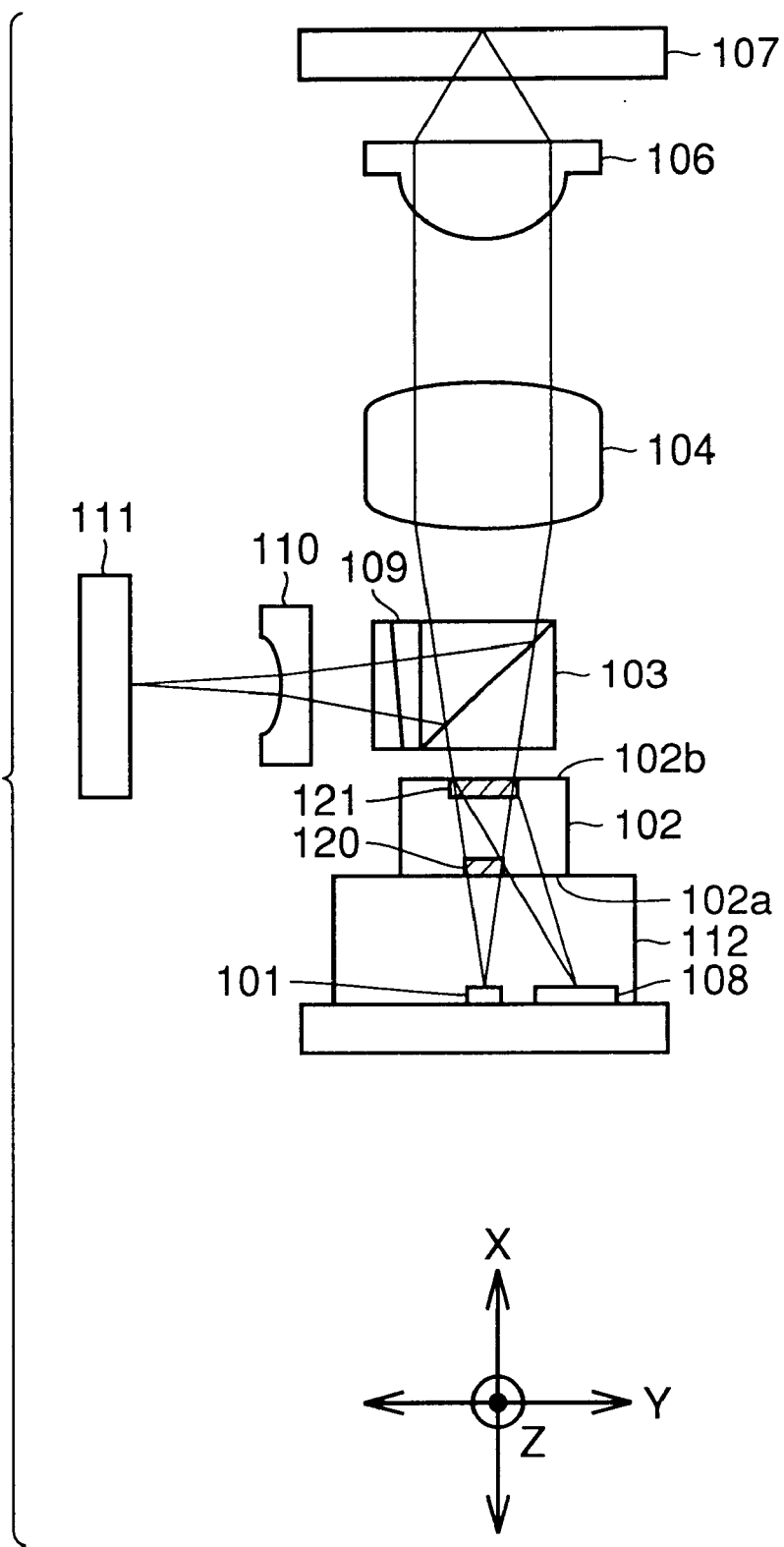
FIG. 17 shows an arrangement of a second conventional example, an optical pickup device which does not shape a beam.

FIG. 13 shows an arrangement of an optical pickup device used in the present embodiment. It is distinguished from the FIG. 9 device in that shaping prism 5 is replaced by two shaping prisms 51 and 52 combined to shape a beam, that a beam is shaped the y direction, and that a beam is shaped with the longer axis reduced. Shaping and arranging shaping prisms 51 and 52 as appropriate allows components to be arranged substantially linearly. Furthermore, since a beam can be shaped twice, a shaping ratio at one time may be reduced and a beam may be incident on shaping prisms 51 and 52 at a smaller angle of incidence. Furthermore, as an angle of incidence is smaller, an S polarization component is hardly reflected at a plane of incidence. While such reflection of an S polarization component can also occur in the return optical system, if a beam can be incident on shaping prisms 51 and 52 at a smaller angle of incidence, as described above, an S polarization component resulting from an magneto-optical effect that is contained in a light reflected from optical disc 7 is hardly be lost and a magneto-optical signal is hardly be degraded in quality. It should be noted that shaping prisms 51 and 52 may be identical components.

The configuration of hologram laser 12 the shape of the photodetector 11 light receiving portion are the same as shown in FIGS. 10 and 11A–11B, and will thus not be described.

In the first and second embodiments, collimator lens 4 has a focal length of 7.65 mm and an effective NA of 0.17, receiving from semiconductor laser 1 a beam with an ellipticity of three and enlarging its elliptic cross section by multiplying the shorter axis by a shaping ratio of 1.5 to obtain a corrected ellipticity of two.

In the present embodiment, in contrast, collimator lens 4 has a focal length of 11.47 mm, receiving from semiconductor laser 1 a beam with an ellipticity of three and reducing its elliptic cross section by 1/1.5 in the longer axis's direction to obtain a corrected ellipticity of two. As such, as in the second embodiment, on photodetector 7 a spot has an elliptic shape with its longer axis corresponding to the z direction, with a spot diameter of 0.94 $\mu$m in the z direction and that of 0.83 $\mu$m in the y direction. Furthermore, a beam incident on shaping prism 51 has an elliptic cross section with a diameter in the longer axis's direction (the y direction) that is 1.5 times that diameter in the direction which a beam emerging from shaping prism 52 has, and collimator lens 4 may thus have an effective NA corresponding to a radius of an effective aperture of objective lens 6 that is multiplied by 1.5 and then divided by the collimator lens 4 focal length. Thus the effective NA is 0.17, which is the same as in the first and second embodiments and so is light availability. Since collimator lens 4 can be increased in focal length without changing a converged spot's diameter or light availability, polarized-beam splitter 3 and other components can be more readily arranged in a converged flux extending between collimator lens 4 and semiconductor laser 1, although the present embodiment is more or less disadvantageous in miniaturizing an optical system, since the reduced longer axis would result in a component having an increased effective aperture.

Furthermore, since collimator lens 4 and objective lens 6 can be increased in magnification, an FES can be effectively drawn in in an enlarged range and on photodetectors 8 and 11 three beams can be effectively spaced further apart.

While the above embodiments all employ three beams, the present invention is not limited thereto and it may use five or seven beams separated. Furthermore, although it can only be applied to reading, a light emerging from semiconductor laser 1 may be separated by diffraction element 2 into more than one beam and each such beam may illuminate a desired land or groove or land and groove to read the information recorded in the illuminated location.

For example, for optical disc 7 with a spiral track, a land and a groove adjacent thereto may be illuminated by two beams to simultaneously read the information recorded in two location.

In accordance with the present invention an optical pickup device includes a semiconductor laser; a collimator lens converting to a collimated flux a divergent flux emitted from the semiconductor laser; beam shaping means converting a ratio between shorter and longer diameters of an elliptic cross section of the collimated flux formed by the collimator lens; and an objective lens converging on an information recording medium the flux output from the beam shaping means, and receiving a flux reflected from the information recording medium; wherein the beam shaping means shapes a beam to allow the flux output therefrom to have an elliptic cross section having a ratio between shorter and longer diameters of no more than two.

Thus a converged spot can effectively have an area stopped down, reduced to be substantially equal to an area of a beam spot shaped completely round in cross section.

In the optical pickup device, preferably the beam shaping means is set to shape a beam to allow the flux output therefrom to have an elliptic cross section having a ratio exceeding one between the shorter and longer diameters.

Thus, light availability can be effectively increased.

Preferably the optical pickup device also includes light separation means separating the flux reflected from the information recording medium in a direction of the semiconductor laser and in a direction different from the direction of the semiconductor laser, and a diffraction element diffracting the flux reflected from the information recording medium and directing the diffracted flux to a photodetector, wherein the light separation means and the diffraction element are arranged in an optical path extending between the collimator lens and the semiconductor laser.

Since an optical component can be arranged in a divergent flux between the collimator lens and the semiconductor laser, the optical component may be reduced in effective aperture and it can thus be reduced in size and hence cost. Thus a compact optical system can be provided.

In the optical pickup device, still preferably the beam shaping means increases the shorter diameter of the elliptic cross section to shape a beam.

As such a collimator lens of short focal length can be effectively used to configure an optical system of high light availability so that a compact optical system can be provided.

Still preferably, shaping a beam in a direction matching a tracking direction allows a large angle of rotation to be used to adjust three beams. Thus such adjustment can be performed with improved resolution and also less susceptible to an effect of a hologram laser's rotation that is attributed to the passage of time.

Still preferably, shaping a beam in a direction matching a tangential direction allows three beams to be effectively spaced closer in the tangential direction so that the optical pickup device may be attached with reduced precision to a mechanism delivering the device in a tracking direction. Furthermore, spacing three beams closer allows a large variation in angle to be used to adjust three beams. As such, such adjustment can be performed with improved precision and also less susceptible to an effect of the passage of time.

In the optical pickup device, still preferably the beam shaping means reduces the longer diameter of the elliptic cross section to shape a beam.

As such, as the beam shaping means has larger shaping ratios the collimator lens has longer focal lengths. As such an optical component can effectively, more readily be arranged in an optical path extending between the collimator lens and the semiconductor laser.

Furthermore the objective lens and the collimator lens can be increased in magnification and an FES can thus be effectively drawn in in an increased range.

Furthermore the objective lens and the collimator lens can be increased in magnification and on the photodetector the three beams can thus be effectively spaced farther apart and the detector's receiving portion can be effectively shaped with an increased degree of freedom.

In the optical pickup device, still preferably the diffraction element and the light separation means are spaced by a set range of 0.5 mm to 2.0 mm and the light separation means and the collimator lens are spaced by a set range of 0.5 mm to 2.5 mm.

As such, between such optical components an unnecessary space can be reduced to provide a compact optical system.

In the optical pickup device, still preferably the beam shaping means diffracts a beam at least twice to shape the beam.

As such a beam may be incident on the beam shaping means at a reduced angle of incidence. Thus the beam shaping means at its plane of incidence hardly reflects an S polarization component and an S polarization component resulting from an magneto-optical effect that is contained in a light reflected from optical disc 7 is hardly be lost. As such a magneto-optical signal is hardly degraded in quality. Furthermore, an optical system may be effectively, linearly arranged to allow an optic mounting base to be readily processed and a fabrication adjusting jig to be more readily designed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup device comprising:
   a semiconductor laser;
   a collimator lens converting to a beam formed of a collimated flux and having an elliptic cross section a divergent flux emitted from said semiconductor laser;
   beam shaping means converting a ratio of the longer diameter to the shorter diameter of the elliptic cross section of the collimated flux beam formed by the collimator lens; and an objective lens converging on an information recording medium the flux output from the beam shaping means, and receiving a flux reflected from said information recording medium;

wherein said beam shaping means shapes the beam output by the collimator lens such that the flux output therefrom has an elliptic cross section having a ratio of the longer diameter thereof to the shorter diameter thereof that is greater than 1 but less than or equal to 2.

2. The optical pickup device of claim 1, further comprising light separation means separating the flux reflected from said information recording medium in a direction of said semiconductor laser and in a direction different from the direction of said semiconductor laser, and a diffraction element diffracting the flux reflected from said information recording medium and directing to a photodetector a flux diffracted thereby, wherein said light separation means and said diffraction element are arranged in an optical path extending between said collimator lens and said semiconductor laser.

3. The optical pickup device of claim 1, wherein said beam shaping means increases the shorter diameter of the elliptic cross section to shape a beam.

4. The optical pickup device of claim 1, wherein said beam shaping means reduces the longer diameter of the elliptic cross section to shape a beam.

5. The optical pickup device of claim 2, wherein said diffraction element and said light separation means are spaced by a set range of 0.5 mm to 2.0 mm and said light separation means and said collimator lens are spaced by a set range of 0.5 mm to 2.5 mm.

6. The optical pickup device of claim 1, wherein said beam shaping means diffracts a beam at least twice to shape the beam.

\* \* \* \* \*